April 14, 1925.
G. NICOT ET AL
1,533,939
SANITARY FORK
Filed March 14, 1924
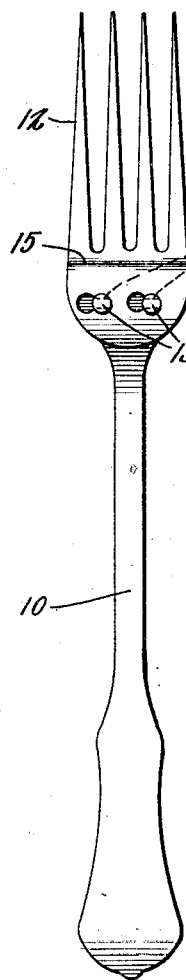
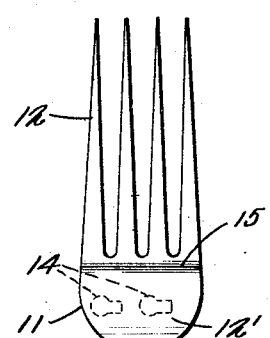
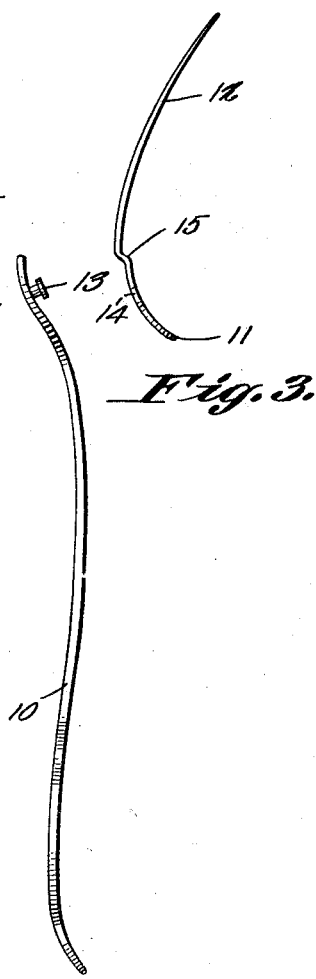
G. Nicot
and C. Grenouillou,
INVENTORS
BY Victor J. Evans
ATTORNEY Patented Apr. 14, 1925.

1,533,939

UNITED STATES PATENT OFFICE.

GEORGE NICOT AND CONSTANCE GRENOUILLOU, OF WEST PALM BEACH, FLORIDA.

SANITARY FORK.

Application filed March 14, 1924. Serial No. 699,244.

*To all whom it may concern:*

Be it known that we, GEORGE NICOT and CONSTANCE GRENOUILLOU, citizens of the Republic of France, residing at West Palm Beach, in the county of Palm Beach and State of Florida, have invented new and useful Improvements in Sanitary Forks, of which the following is a specification.

This invention relates to table forks, and has for its chief characteristic, the provision of a fork wherein the tines as a unit are separably connected with the handle, so that the tines can be replaced for sanitary purposes after each meal or from time to time as the occasion may require.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a rear elevation of the fork showing how the tines are connected with the handle in accordance with one embodiment of the invention.

Figure 2 is a detail view of the tines separated from the handle.

Figure 3 is an edge elevation showing the handle and tines separated.

Referring to the drawings in detail, and particularly to Figures 1 to 3 inclusive, it will be noted that the fork is made up of two sections adapted to be detachably connected together, so that the section provided with the tines can be replaced by a new section at any time desired for sanitary purposes. One of these sections is indicated at 10 and represents the handle of the fork, while the other section is indicated at 11, and from one edge of this section extend the tines 12 which can vary in number without departing from the spirit of the invention. The section 10 may also be of any suitable size and configuration, and provided with means to cooperate with the section 11 to hold the parts associated. For this purpose, we preferably made use of headed studs 13 which project from one side of the handle 10 adjacent one end thereof, and these studs are adapted to be received by transverse slots 14 in the section 11. The slots 14 are substantially key hole shape, and extend in the same direction, so that the headed studs can be received by the large end of these slots during the initial association of the parts, and the section 11 moved laterally across the handle to position it in the manner shown in Figure 1. These sections are then held together in a similar manner so that the fork can be used in the ordinary way and at the same time permit the section 11 to be conveniently and easily separated from the handle section 10, and a new section substituted in its place at any time. The slots 14 are initially covered with a thin layer of tin or other suitable substance which can be easily penetrated by the headed studs when the parts are first associated. This material or substance is indicated at 12′, and when this material has been punctured or penetrated, it operates as notice to others that this particular section of the fork has been used. The body portion of the section 11 is preferably arranged at an angle with relation to the tines 12, and is offset as at 15, the offset portion reposing upon the edge of the handle as shown.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

Having thus described the invention, we claim:

A fork including separable sections, one section constituting a handle slightly curved at one end, headed studs projecting from said end, the other section including a body portion and a plurality of tines projecting from one edge thereof, said body portion being offset with relation to said tines and curved to correspond to the curvature of said end of the handle, said body portion having key hole slots arranged transversely of the body and adapted to receive the headed studs whereby said sections are detachably connected together, and a shoulder arranged between the body portion and said tines and adapted to engage the adjacent end of the handle when the parts are associated, thereby affording the fork strength and rigidity.

In testimony whereof we affix our signature.

GEORGE NICOT.
CONSTANCE GRENOUILLOU.